Nov. 24, 1959     G. W. CLARKE ET AL     2,914,599
SUBMARINE CABLE REPEATER HOUSINGS

Filed Jan. 19, 1954     2 Sheets-Sheet 1

INVENTORS
George William Clarke, Deceased
By Barclays Bank Limited of
London, England, Executor,
William Kirby Weston and,
Robert J. M. Andrews By Philip M. Bolton
Attorney Nov. 24, 1959   G. W. CLARKE ET AL   2,914,599
SUBMARINE CABLE REPEATER HOUSINGS
Filed Jan. 19, 1954   2 Sheets-Sheet 2

INVENTORS
George William Clarke, Deceased
By Barclays Bank Limited of
London, England, Executor
William Kirby Weston
Robert J.M. Andrews
By Philip M. Bolton
Attorney

United States Patent Office 2,914,599
Patented Nov. 24, 1959

2,914,599
SUBMARINE CABLE REPEATER HOUSINGS

George William Clarke, deceased, late of London, England, by Barclays Bank Limited, executor, London, England, and William Kirby Weston and Robert James Maddock Andrews, London, England, assignors to International Standard Electric Corporation, New York, N.Y., a corporation of Delaware Application January 19, 1954, Serial No. 404,980

Claims priority, application Great Britain January 20, 1953

2 Claims. (Cl. 174—50.5)

This invention relates to water-tight housings to contain electrical apparatus connected into a submarine cable laid in deep water. The problem in constructing such a housing is that the hydrostatic pressure to which it is subjected in service is very high and difficulty is encountered in designing satisfactory water-tight sealing devices through which the cable conductor or conductors can be led into the chamber containing the electrical apparatus, which must be moisture-free and not subjected to high pressures. It will be appreciated that apparatus such as electronic tubes or capacitors cannot be exposed to pressures of the order of several tons per square inch. The submarine cable into which such apparatus is to be connected will normally consists of a conductor surrounded by waterproof insulating material such as, for example, polymerised ethylene (polythene), and may also comprise an outer return conductor surrounding the insulating material.

It is therefore necessary to lead the insulated central conductor into a chamber containing the apparatus and to seal the entry in such a way that no water can enter the chamber. A sealing device permitting the insulated cable conductor to be passed through a bulkhead separating a chamber exposed to full hydrostatic pressure from an apparatus chamber maintained under substantially atmospheric pressure is described and claimed in co-pending application Serial No. 404,543, filed January 18, 1954, for Submarine Cable Repeater Housings by W. K. Weston et al.

The object of the present invention is to provide a moisture tight seal between the bulkhead and the wall of the housing.

Preferably the housing consists of a generally cylindrical hollow metal shell divided so as to form three separate chambers. The central chamber contains the apparatus and is maintained at substantially atmospheric pressure while the two end chambers contain the fittings necessary for attaching the submarine cable armour wires to the housing. These outer chambers in service are subjected to the full hydrostatic pressure and are separated from the low pressure apparatus chamber by means of pressure resisting transverse bulkheads. In order to enable the apparatus to be inserted into the housing and to provide access to the apparatus before the final sealing the bulkheads must be removable and this necessitates special sealing arrangements such as those forming the subject matter of the present invention.

Accordingly the invention provides a housing for electrical apparatus associated with a submarine cable comprising a bulkhead closing a chamber containing the said apparatus and subjected on one side only to hydrostatic pressure and having a small degree of freedom of movement under pressure so as to be pressed against a shoulder in said housing and an annulus of relatively soft metal caused to flow under said pressure, and so placed in relation to said shoulder to form an anti-diffusion seal between the bulkhead and said housing.

Although in the preferred embodiment the housing comprises three chambers it may in some cases be desired to construct a housing having two chambers only, a low pressure apparatus chamber and a single outer chamber into which the submarine cables are led. This chamber would be separated from the apparatus chamber by means of a pressure resisting bulkhead through which the insulated conductors would be separately led. The means for providing a moisture tight seal between the bulkhead and the wall of the housing will be the same either for a three chamber or a two chamber housing.

An embodiment of the invention will now be described with reference to the accompanying drawings in which.

Figure 1:
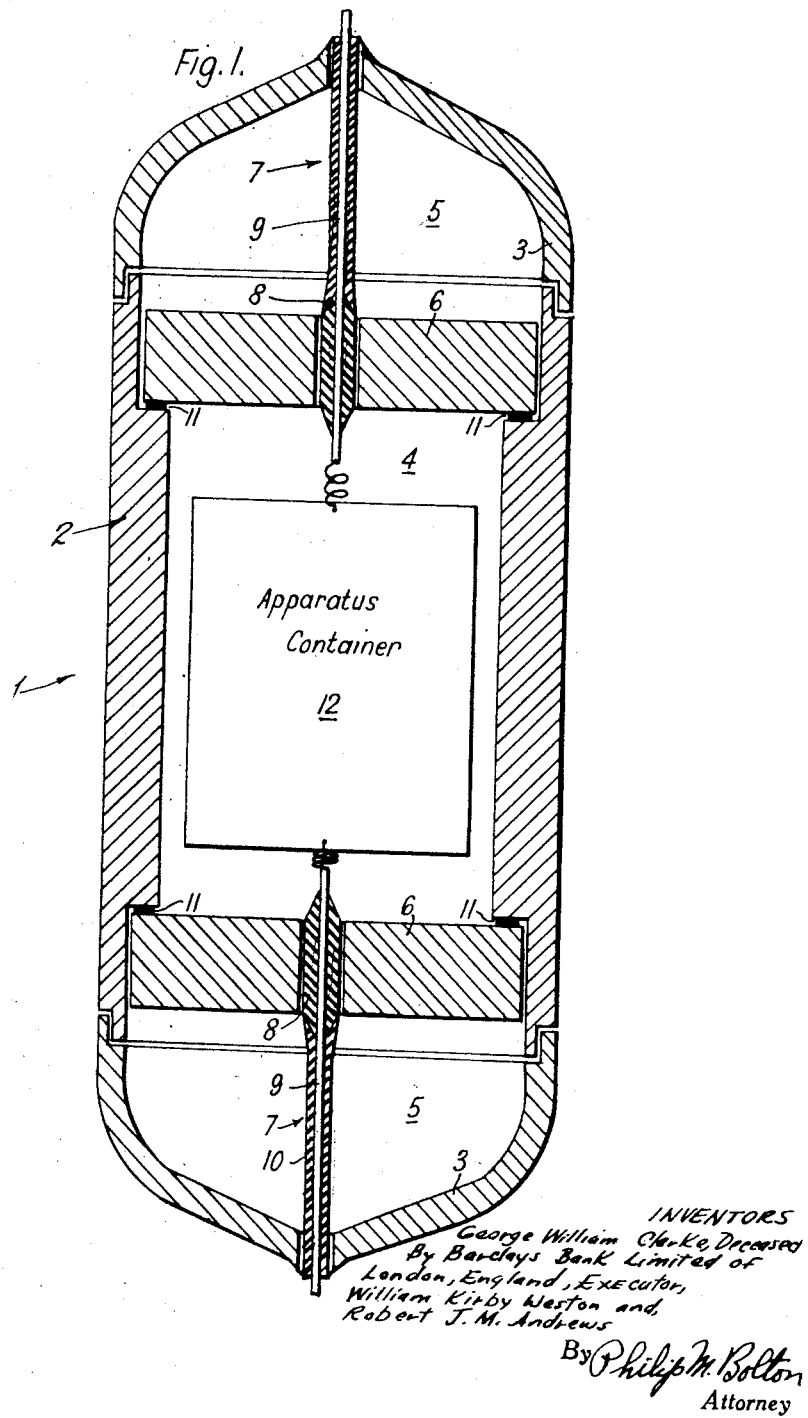
Fig. 1 represents diagrammatically a housing to contain electrical apparatus connected to a submarine cable and to be immersed in deep water.

In Fig. 1 there is shown diagrammatically a three chamber housing 1 comprising a generally cylindrical pressure resisting casing 2 fitted with end caps 3. There is shown a centrally positioned low pressure chamber 4 and two end sections 5 which are subjected to the full hydrostatic pressure. The end sections 5 are separated from the apparatus chamber 4 by pressure resisting bulkheads 6. The submarine cable cores are brought into the end sections 5 and the armouring is attached to the housing while the submarine cable cores are jointed to cable cores 7 leading to sealing devices 8 passing through the bulkheads 6. The cable cores 7 each consist of a conductor 9 and an insulating coating 10. The sealing device 8 forms the subject matter of co-pending application Serial No. 404,543, filed January 18, 1954, for Submarine Cable Repeater Housings.

The present invention is only concerned with the method of sealing the bulkheads 6 into the housing 1 in such manner that absolutely no moisture can get past the bulkhead into the apparatus chamber 4. Fig. 1 is only diagrammatic but it will be observed that the bulkheads 6 are pressed against shoulders in the wall of the pressure resisting housing 2 and as shown rings of soft metal 11 are placed between the bulkhead and the shoulder to form the moisture proof seals. The repeater apparatus can conveniently be mounted in a closed container 12. As the figure is only intended to be diagrammatic the various clearances between component parts have been exaggerated. The actual construction proposed for the sealing arrangements illustrated at 11 will be described in detail with reference to Fig. 2.

Figure 2:
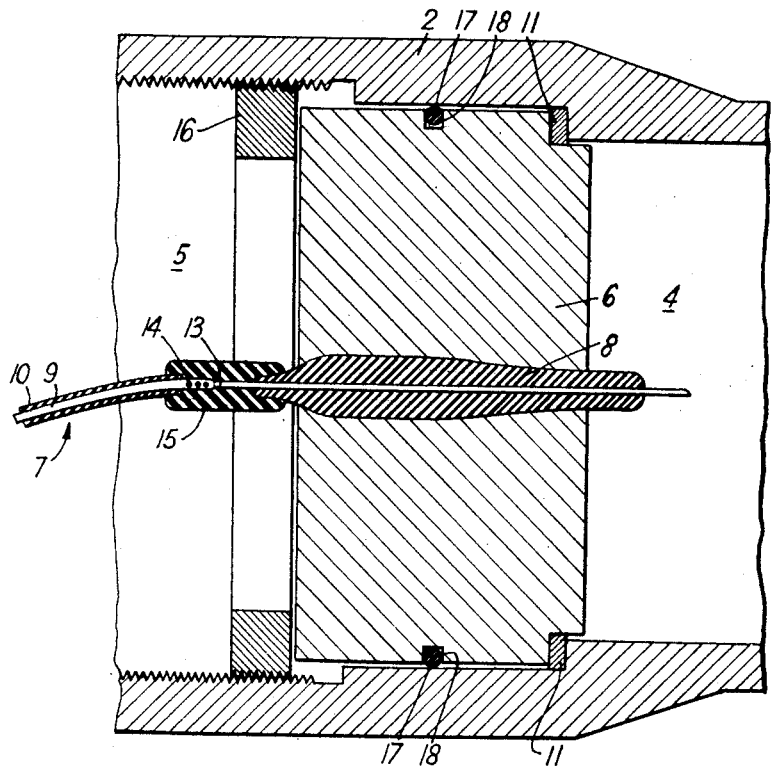
Fig. 2 shows in section the bulkhead in position inside the housing and the sealing arrangements according to the present invention.

In Fig. 2 there is shown one of the bulkheads 6 of Fig. 1 transversely positioned across the pressure resisting casing 2 of the housing. The cable core 7 is led into the end section 5 which is the high pressure chamber and the conductor 9 is connected to a conductive rod 13 by means of a soldered or brased joint 14. A mass of insulating material 15 is moulded around the end of the cable insulation 10 of the core 7 to cover the joint 14 and overlap the insulation of the sealing device 8 which is sealed into an aperture in the bulkhead 6. The sealing device 8 is not described or shown in detail as it forms the subject matter of co-pending application Serial No. 404,543, filed January 18, 1954, for Submarine Cable Repeater Housings, but it is to be understood that it provides a moisture proof seal through which the conductor 9 is connected to the electrical apparatus in the low pressure apparatus chamber 4.

The bulkhead 6 is pressed up against a shoulder in the pressure resisting housing and as shown between the bulkhead 6 and the shoulder there is placed an annular ring 11 of soft metal such as copper and the bulkhead 6 is held in position by the bulkhead retaining ring 16 which is screwed into the outer portion of housing 2 as shown. It is to be understood that the clearances between the housing 2 and the bulkhead 6 as shown in Fig. 2 are in practice very small, in fact the various parts are close sliding fits. It follows that when the retaining ring 16 is screwed home the soft metal annular ring 11 is squeezed closely between the bulkhead 6 and the shoulder in the housing 2. High pressure is then applied to the bulkhead 6, the pressure being such that the pressure applied to the sealing ring 11 is at least as high as that to which it will be subjected when the housing is submerged in service. This causes the soft metal seal 11 to flow and seal the interstices between the bulkhead and the housing in a completely moisture tight manner. The clearances are so small that the soft metal cannot be extruded from the sealing position altogether. The retaining ring 16 is then tightened up as firmly as possible so that the seal 11 shall not be impaired by any subsequent handling of the housing before it is finally submerged.

Although the moisture proof seal 11 provides a moisture proof seal so long as pressure is maintained on the bulkhead it is considered necessary to provide a peripheral water tight seal surrounding the bulkhead to prevent water being forced past the bulkhead and up to the seal 11 during the process of immersing the housing in the sea and before the full pressure is applied to the bulkhead. Such a water tight seal can be formed by means of a resilient deformable ring 17 inserted in a peripheral groove 18 in the outer surface of the bulkhead. The resilient ring 17 can be made of some high grade deformable organic product, some forms of synthetic rubber being particularly suitable.

When the ring 17 is first inserted in the groove it is circular in cross section and its cross sectional diameter is slightly greater than the depth of the groove 18.

When the bulkhead is pressed into the housing the ring 17 will be deformed and will be in firm contact with the bottom of the groove 18 and the inner surface of the housing 2. When the hydrostatic pressure is applied to the bulkhead some water will pass between the bulkhead and the inner surface of the housing until it reaches the deformable ring 17. This will be firmly pressed against the bottom of the groove 18 and the inner surface of the housing 2 and also against the side of the groove 18 nearest to the low pressure chamber 4. Thus the ring 17 will form a water tight seal between the bulkhead and the housing. Such rings of organic material as the ring 17 do, however, permit of passage of water vapour through the actual material by diffusion but any water vapour which diffuses through the ring 17 will be unable to pass the moisture proof anti-diffusion seal 11.

If desired more than one water tight seal similar to that described can be provided in the periphery of the bulkhead.

Figure 3:
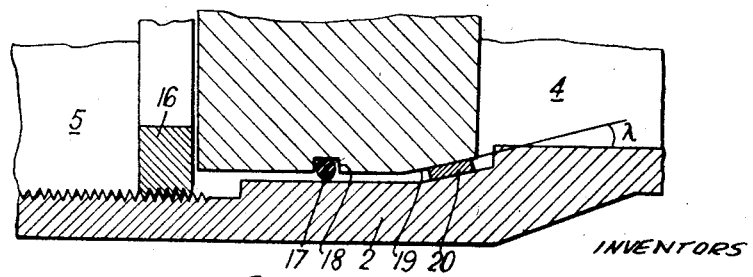
Fig. 3 shows an alternative arrangement of the seal.

In Fig. 3 is shown an alternative arrangement of moisture tight anti-diffusion seal. In this case the low pressure end of the bulkhead 6 is tapered as shown at 19 and this tapered end is forced into a correspondingly tapered portion constituting a shoulder of the housing 2. A soft metal conical ring 20 of suitable cross section is placed between the tapered portion 19 of the bulkhead 6 and the corresponding internal taper of the housing 2. When high pressure is applied to the bulkhead 6 the soft metal ring 20 is caused to flow and to fill up the interstices between the bulkhead 6 and the housing 2. The angle of taper $\lambda$ between the axis of the housing and the tapered surfaces must not exceed the angle of friction for the materials employed for the soft metal ring 20 on the one hand and the bulkhead and housing on the other hand. For example, in the case of a copper sealing ring and steel bulkhead and housing an angle not exceeding 8° can be postulated as satisfactory. Providing the angle of friction is not exceeded the seal will remain in position once it has been caused to flow by the applied high pressure.

The use of a water tight seal such as that shown consisting of deformable ring 17 in groove 18 is not essential in this construction as the anti-diffusion seal formed by the soft metal ring 20 remains moisture tight even when the high pressure is released. Nevertheless the use of the water tight seal is preferable as a precaution.

It is to be understood that in Fig. 3 the clearances and the angle $\lambda$ have been exaggerated in the interest of clarity.

While the principles of the invention have been described above in connection with specific embodiments, and particular modifications thereof, it is to be clearly understood that this description is made only by way of example and not as a limitation on the scope of the invention.

What we claim is:

1. A housing for submarine electrical apparatus comprising an elongated tubular member constituting the outer shell of the housing, the internal diameter of said tubular member being enlarged at each end portion to form a shoulder, means for closing each end of said tubular member comprising a bulkhead dimensioned to fit snugly in the end portion of the tubular member the internal diameter of said bulkhead being reduced at its low pressure side to form a shoulder adapted to register with the shoulder of said tubular member, a soft metal annulus positioned between said shoulders and capable of flowing under hydrostatic pressure to which said bulkhead is exposed, whereby the interstices between the bulkhead and the tubular member are sealed, said bulkhead having a peripheral groove intermediate its ends, a shielding ring positioned in said groove and forming a seal between said bulkhead and said tubular member to prevent penetration of water to said annulus and a threaded ring screwed into the end of said tubular member for retaining the bulkhead in that position which it occupied when exposed to said pressure.

2. A housing as claimed in claim 1 in which said annulus is on a conical surface making an angle with the axis of said tubular member not exceeding the angle of friction for the contacting materials.

References Cited in the file of this patent

UNITED STATES PATENTS

| | | |
|---|---|---|
| 1,825,774 | Boynton | Oct. 6, 1931 |
| 2,155,650 | Gilbert | Apr. 25, 1939 |
| 2,359,846 | Hayman | Oct. 10, 1944 |
| 2,665,877 | MacGregor | Jan. 12, 1954 |